United States Patent
Diepeveen

[19]

[11] Patent Number: 4,516,1[?]
[45] Date of Patent: May 7, 19[?]

[54] ELEVATION STEP SCANNER

[75] Inventor: Neal Diepeveen, Fairlawn, N.J.

[73] Assignee: Magnavox Government and Industrial Electronics, Co., Ft. Wayne, Ind.

[21] Appl. No.: 471,616

[22] Filed: Mar. 3, 1983

[51] Int. Cl.³ .................. H04N 1/10; H04N 3/08; H04N 1/04

[52] U.S. Cl. .................. 358/293; 358/206; 358/285; 350/486; 250/236

[58] Field of Search .............. 358/285, 293, 208, 206, 358/113; 350/6.6, 486; 250/235, 236

[56] References Cited

U.S. PATENT DOCUMENTS 4,164,753  8/1979  Metcalf ........................... 358/113
4,306,252 12/1981  Fearnside ......................... 358/293

FOREIGN PATENT DOCUMENTS 1238783  7/1971  United Kingdom .

Primary Examiner—Howard W. Britton
Assistant Examiner—John K. Peng
Attorney, Agent, or Firm—Marc D. Schechter

[57] ABSTRACT

An optical scanning device, for scanning bundles parallel rays of light defining a field of view, include substantially planar disc, means for rotating the disc its axis, and a substantially planar reflective memb The disc has a first portion which is reflective anc second portion which is transmissive. The planar refl tive member is arranged in a fixed position behind 1 disc such that the normal to the planar reflective me ber subtends a nonzero angle with respect to the d axis. As the disc is rotated, the light rays to be scann are alternately incident upon the reflective portion the disc and the transmissive portion of the disc. Wh the light rays are incident on the transmissive portic they pass through the disc and are reflected by the fix reflective member which is arranged behind the di Both the reflective portion of the disc and the fix reflective member reflect the light rays to be scann onto a fixed detector. Due to the different elevati angles of the disc and the fixed mirror, different bund of parallel rays of light are scanned onto the detectc 11 Claims, 5 Drawing Figures

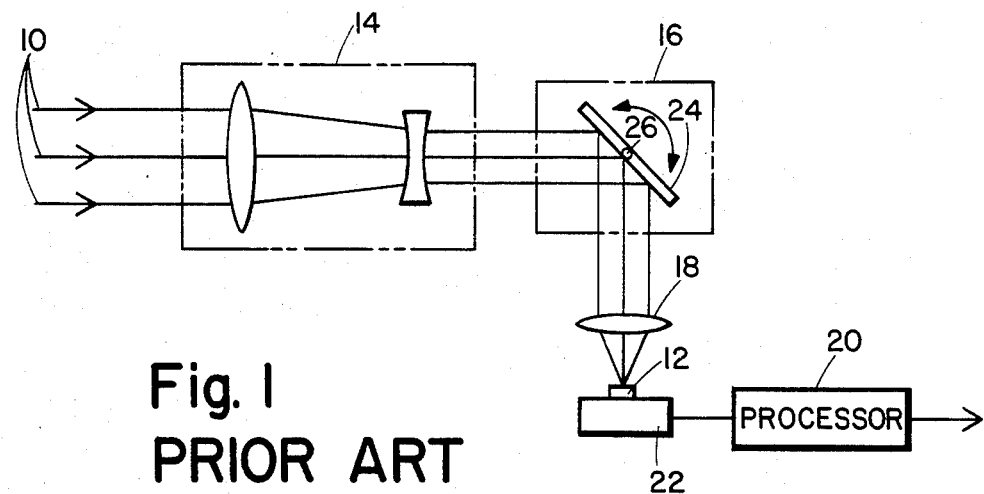
Fig. 1 PRIOR ART
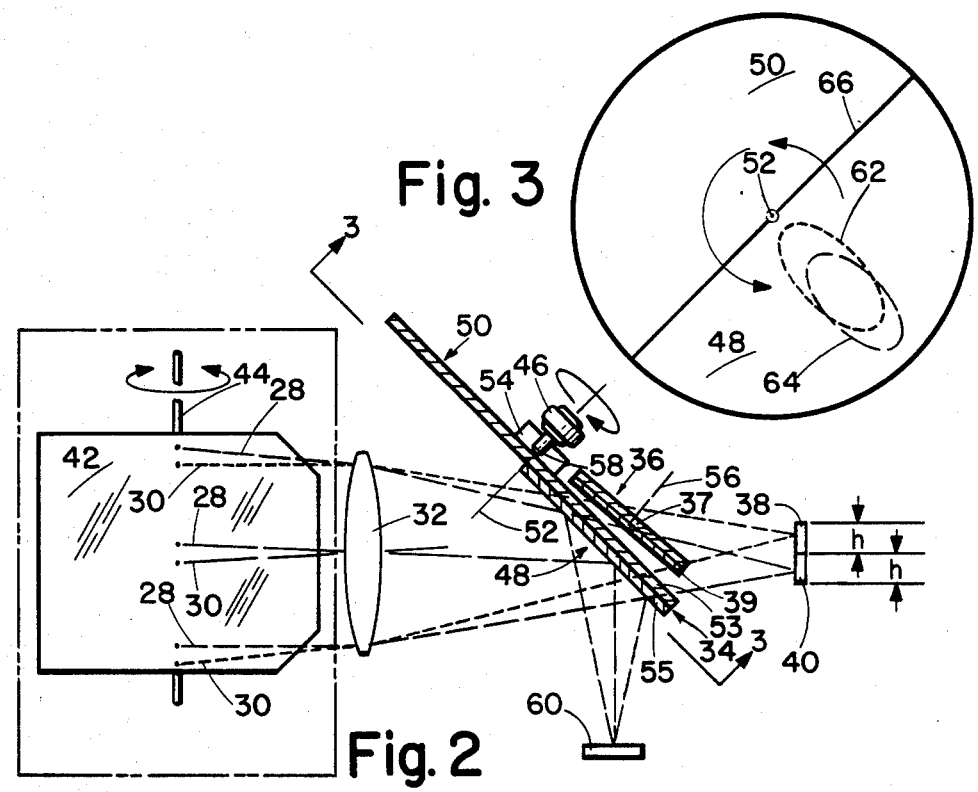
Fig. 2
Fig. 3

ELEVATION STEP SCANNER

BACKGROUND OF THE INVENTION

The invention relates to optical imaging devices for scanning a field of view and converting an image from the field of view into one or more electrical signals. More particularly, the invention relates to optical scanning devices for scanning an optical image in a field of view. In practice, the image is scanned onto one or more optical detectors.

A conventional optical imaging device, for example an infrared imaging system known as the U.S. Common Module infrared imaging system, is shown in FIG. 1. In this system, light rays 10 from an optical field of view are scanned across and focussed onto a linear detector array 12 via an afocal lens arrangement 14, a scanner 16, and an imaging lens 18. Electrical signals generated by detectors 12 are, for example, amplified by processor 20. Processor 20 may perform other functions as well. Finally, the electrical signal or signals produced by processor 20 are fed, for example, to an array of light emitting diodes (not shown) to produce a visible image corresponding to the infrared image which was scanned. The signals from processor 20 may alternatively be fed to other display devices, they may be sent to a storage device, or they may be further processed, depending upon user requirements.

The conventional system shown in FIG. 1 is a parallel scan system. Scanning is accomplished by focussing bundles of parallel rays of light onto the detectors in array 12. The detectors in array 12 extend in a line perpendicular to the drawing on support 22. As shown in FIG. 1, parallel light rays 10, all of which need not be in the plane of the drawing figure, are first converted into a beam bundle of smaller cross-sectional area by afocal lens arrangement 14. This is done principally for convenience to decrease the size of the detector while maintaining high light-gathering ability. Light rays 10 are then incident on a planar scanning mirror 24 which is caused to reciprocate around axis 26 (axis 26 is perpendicular to the plane of the drawing) as shown by the arrows in FIG. 1.

When mirror 24 is at the position shown in FIG. 1, the light rays 10 are reflected such that they are focussed onto a single detector element of the linear array 12. At this same instant, other light rays from the scene (not shown), which are not parallel to rays 10, are focussed onto other detector elements of array 12 which extends perpendicular to the plane of the drawing (i.e. detector array 12 extends vertically). In this manner, a vertical line from the scene to be observed is imaged onto the detector array.

Now, after mirror 24 rotates to a new position, neither light rays 10 nor the other light rays from the vertical line of the scene are any longer focussed onto detector array 12. The vertical line of the scene is now focussed to one side of array 12. Instead, other parallel beam bundles are focussed onto the array. Consequently, a different vertical line from the scene, horizontally displaced from the first vertical line, is now imaged onto the detector array 12. By continuously rotating mirror 24 through a fixed angle around axis 26, first clockwise and then counterclockwise, the entire scene is sequentially imaged (vertical line-by-vertical line) onto the detector array 12. This type of scaning is described as azimuth scanning. The angular position of mirror 24 around axis 26 (after chosing a refere position of zero) is the azimuth angle.

While in theory the above-described azimuth scan can scan a complete scene, in practice gaps are crea by the finite vertical separation between each detec in the array 12. Thus, the scene is scanned continuou in the horizontal direction but discontinuously in vertical direction, thereby detecting spaced horizon lines from the scene.

At the same time mirror 24 is oscillated around 26, conventional systems also superimpose a small ro ing motion which tilts the mirror 24 around an axis ( shown) which is perpendicular to axis 26 and which i the plane of the mirror 24. The angular position of m ror 24 around this horizontal axis (after chosing a rei ence position of zero) is the elevation angle. This sup imposed rocking motion varies the elevation angle o slightly, but sufficiently to provide interlace.

The total field of view of the parallel scan syst described above is determined by the number, size, a spacing of elements in the linear detector array (which determine the total elevation angle) and by scan angle (which determines the total azimuth). T scan angle is the maximum angle of rotation of the n ror 24. The ratio of the azimuth angle to the total ele tion angle is called the aspect ratio. Typical aspect tios are 1:1, 4:3, and 2:1.

If larger fields of view are desired in Common M ule systems, it is necessary to utilize a longer array detectors. To maintain resolution, this requires the of additional detector elements in the array. For exa ple, doubling the number of detector elements provi four times the field of view, if the aspect ratio is k constant. Unfortunately, while the increased perf mance attained with more detectors is relatively eas achieved, it is at a much higher cost due to (1) higher cost of the detector array, (2) the higher cost the processing electronics, and (3) the larger volu needed to house the imaging device.

SUMMARY OF THE INVENTION

It is an object of the invention to provide an opti imaging device with an increased field of view, 1 without the use of additional detectors and amplifie:

It is a further object of the invention to provide optical imaging device with a constant field of vi with a smaller detector array.

It is another object of the invention to provide optical imaging device with improved resolution.

It is a further object of the invention to provide optical scanning device for scanning an increased fi of view in a simple and reliable manner.

According to the invention, an optical scanning vice comprises a substantially planar disc, means rotating the disc on its axis, and a substantially plar member reflective to the light rays being scanned. T disc has a first portion which is reflective to the lig rays being scanned and a second portion which is tra missive to the light rays being scanned. The plar reflective member is arranged near the disc in a fix position relative to the disc axis. The normal to 1 planar member subtends a nonzero angle with respect the disc axis.

Preferably, the disc is substantially circular and it divided into two semicircular portions, one of which reflective and the other of which is transmissive. T transmissive portion is preferably substantially transp ent to the light rays being scanned.

According to another preferred aspect of the invention, the means for rotating the disc comprises an electric motor which rotates the disc at a substantially constant angular velocity. The planar member is preferably a fixed mirror, and the normal to the fixed mirror and the disc axis are arranged in a single plane.

An optical imaging device according to the invention includes a substantially planar disc, means for rotating the disc on its axis, a substantially planar member reflective to the light rays being scanned, and means for detecting the light rays being scanned. The disc is again partially reflective and partially transmissive. The light rays being scanned are incident on the front of the disc, and the planar reflective member is arranged behind the disc in a fixed position such that light rays being scanned, which pass through the transmissive portion of the disc, are incident on the reflective member. Again, the normal to the reflective member subtends a nonzero angle with respect to the disc axis. The means for detecting the light rays being scanned is arranged in the paths of the light rays reflected from the disc and the fixed mirror.

Preferably, the detector means comprises a linear array of point detectors located in the same plane as the normal to the fixed mirror and the disc axis.

In another preferred aspect of the invention, a lens is provided in the paths of the light rays which are incident on the disc in order to focus the light rays onto the detector array. The light rays to be scanned are incident on a portion of the disc whose area is substantially less than one-half the area of the disc.

BRIEF DESCRIPTION OF THE DRAWING

FIG. 1 is a schematic diagram of a known imaging system having an optical scanning device.

FIG. 2 is a partly cross-sectional and partly side elevational view of an optical scanning device according to the invention.

FIG. 3 is a plan view of a half-reflective, half-transmissive disc for use in an optical scanning device according to the invention.

DESCRIPTION OF THE PREFERRED EMBODIMENTS

Figure 4:
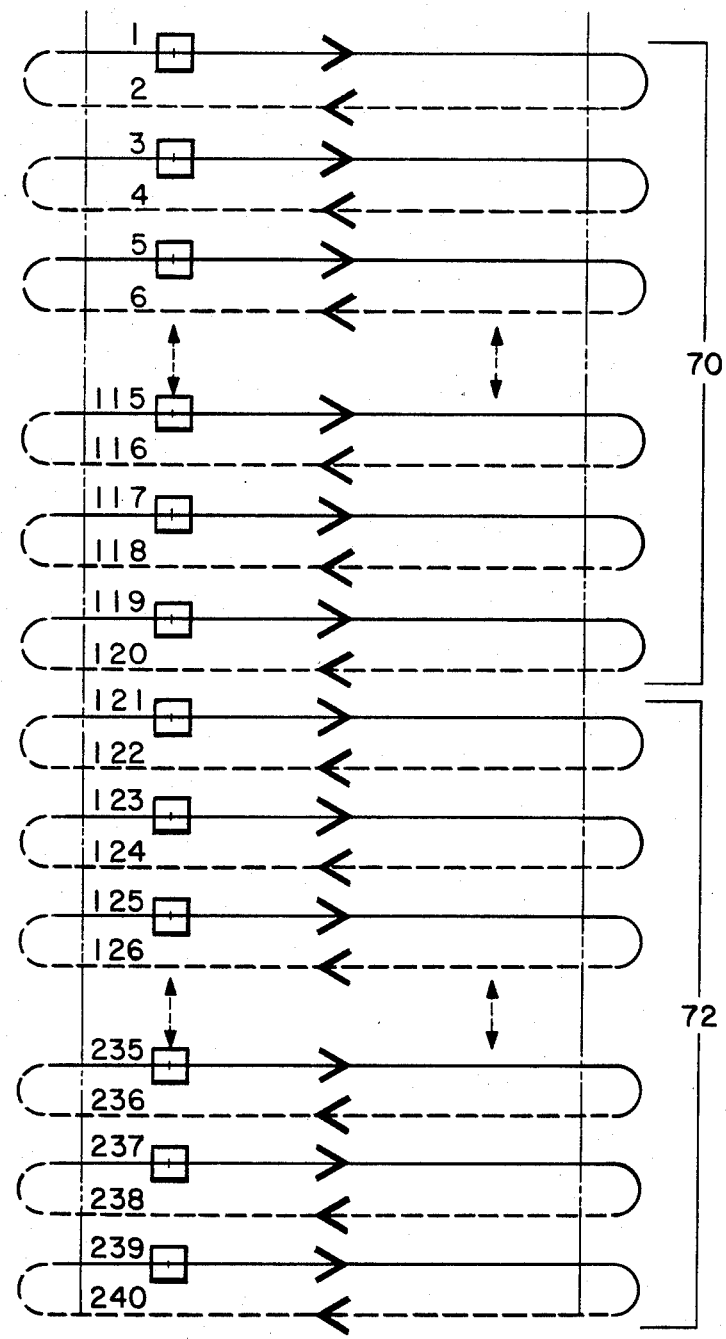
FIG. 4 is a tracing, superimposed on a field of view, of the scan lines in an optical scanning device according to the invention.

FIG. 2 shows a portion of an imaging system which includes an optical scanning device according to the present invention. As discussed with respect to the known imaging systems (FIG. 1), the scanning device according to the invention is designed for scanning bundles of parallel rays of light. These ray bundles, which are incident on the optical scanning device from many different directions, define a field of view. An optical imaging device both scans the field of view and converts an optical image in the field of view into one or more electrical signals.

In FIG. 2, two bundles 28 and 30 of parallel light rays in the field of view are shown. Bundle 28 is inclined downwardly with respect to FIG. 2, and bundle 30 is inclined upwardly. Each of these ray bundles are focussed by imaging lens 32 to produce (in the absence of disc 34 and mirror 26, more fully described below) portions of images 38 and 40. Ray bundle 28 and other ray bundles which are also inclined downwardly combine to form image 40. Ray bundle 30 and other ray bundles which are inclined upwardly combine to form image 38.

From what has been described thusfar, images 38 and 40 would remain in fixed positions. In order to scan these images side-to-side (i.e. perpendicular into and out of the plane of the drawing, the scan direction) a conventional planar scanning mirror 42 is provided. Mirror 42 is, for example, identical to the planar scanning mirror 24 shown in FIG. 1. It is pivoted around axis 44 by means (not shown) which change the direction of rotation after the rotation has reached a predetermined amplitude in each direction.

As discussed above, in the absence of disc 34 and mirror 36, images 38 and 40 will oscillate into and out of the plane of FIG. 2. By placing a linear array of detectors at the locations of images 38 and 40, the entire field of view will be scanned across the linear detector array in the same manner shown in FIG. 1. By selecting images 38 and 40 having the same height, h, the length of the detector array will be equal to 2h.

According to the present invention, a detector array having a length h, one-half of the length of the array necessary to detect images 38 and 40 without the invention, can be used to detect both of these images by providing an additional scanning device. This additional scanning device includes a substantially planar disc 34, a substantially planar reflective member 36, and means 46 for rotating the disc 34.

Referring to FIGS. 2 and 3, disc 34 is divided into two major portions, a first portion 48 being reflective to the light rays (e.g. rays 28 and 30) being scanned, and a second portion 50 which is transmissive to the light rays being scanned. An axis 52 is perpendicular to disc 34. In operation, disc 34 is rotated around axis 52.

Preferably, disc 34 is a substantially planar and substantially circular. It is divided into two semicircular portions 48 and 50, portion 48 being as reflective as possible and portion 50 being as transparent as possible.

For example, disc 34 may comprise an infrared-transmissive substrate 53 made of germanium, silicon, chalcogenide glass, or any other known infrared-transmissive material. The reflective portion 48 of the disc 34 is formed by providing a reflective layer 55 (not to scale) on one-half of the front surface of the disc 34. Preferably, the reflective layer 55 is vapor-deposited aluminum or gold. The transmissive portion 50 of disc 34 is the remaining half of the disc which does not have a reflective layer. Preferably, the transmissive portion 50 includes an antireflection coating (not shown) of, for example, zinc sulfide, zinc selenide, or other known antireflection coating materials.

Alternatively, the disc 34 may be a semicircular substrate with a reflective layer on the front surface. In this embodiment the "missing" half of the disc is the transmissive portion 50.

Member 36 is a substantially planar member which is reflective to the light rays being scanned. The plane of mirror 36 is defined by a normal 56 which is perpendicular thereto. Preferably, mirror 36 is made of a rigid substrate 37 provided with a layer 39 (not drawn to scale) of an infrared-reflecting material such as vapor-deposited aluminum or gold on the front surface thereof.

Means 46 for rotating the disc 34 preferably is an electric motor. The motor shaft (not shown) is aligned with axis 52 of disc 34 and is fastened to a hub 54 preferably by bolt 58. Hub 54 is fastened to substrate 53, for example, by epoxy.

In order to operate the optical scanning device according to the invention, disc 34 and mirror 36 must be placed in the paths of the light rays being scanned. The light rays being scanned approach the disc and the mirror in paths along directions of incidence, and as shown in FIG. 2 either the disc 34 or the mirror 36 alternately reflect the light rays being scanned. The reflected rays follow paths along directions different from the directions of incidence. Both the disc 34 and the mirror 36 are arranged in fixed positions (subject, of course, to the condition that the disc 34 is free to rotate on axis 52) relative to the other components of the imaging system. This may be achieved, for example, by fixing mirror 36 and motor 46 to a housing (not shown).

In order to provide elevational scanning, disc 34 and mirror 36 reflect the light rays being scanned in different paths. This is achieved by providing a nonzero angle between the normal 56 to mirror 36 and disc axis 52.

The operation of the optical scanning device according to the invention can be explained as follows. The convergent rays emerging from the imaging lens 32 strike disc 34 at either reflective portion 48 or transparent portion 50. If reflective portion 48 is in the paths of the incident light rays, the light rays are then reflected to form the image 40, produced by rays 28, on detector array 60. The image of the field of view is thus at a first position with image 40 on the detector array 60.

If, on the other hand, the transparent portion 50 of the disc 34 is in the paths of the incident light rays, then the incident light rays pass through disc 34 onto mirror 36. Mirror 36 reflects the light rays onto detector array 60. However, since the normal 56 to mirror 36 is inclined at a nonzero angle to axis 52 of disc 34, the image focussed onto detector array 60 is now switched or shifted in elevation (the shift direction) as compared to the image previously focussed on array 60 by reflection from disc portion 48. By making the angle between axis 52 and normal 56 large enough, there will be no overlap between the images focussed onto linear array 60. Consequently, the light rays reflected from mirror 36 will now form image 38 on detector array 60. The image of the field of view is thus shifted to a second position.

The light rays being scanned are focussed, by lens 32, onto linear detector array 60 by way of reflection off of disc 34 or mirror 36. In order to scan a rectangular field of view, the normal 56 to mirror 36 and the axis 52 of disc 34 are arranged in a single plane.

In operation, the light rays which form image 38 pass through lens 32 and form a footprint 62 on disc 34. (FIG. 3.) The light rays which form image 40 pass through lens 32 and form a footprint 64 on disc 34. These footprints 62 and 64 are shown in FIG. 3. The area of each of these footprints must be less than one-half the area of disc 34 so that the footprints fall on only a single portion 48 or 50 of the disc during at least some portion of each rotation of the disc. Preferably, the area of the footprints is substantially less than one-half the area of the disc.

As the disc 34 is rotated, the transition 66 between the transparent portion of the disc and the reflective portion of the disc passes through the footprints 62 and 64. During the time it takes for this transition 66 to pass through the footprints, the image in the field of view cannot be scanned. Accordingly, it is desireable to make the footprint as small as possible so that the transition passes through the footprints as quickly as possible.

It is sufficient, however, to make the footprints sn enough, compared to the active disc area, to obtair least 75% scan efficiency. That is, at least 75% of time the transition 66 is not within the footprints 62 ɛ 64 (i.e. the transition 66 is within the footprints 62 ɛ 64 not more than 25% of the time). Typically, the e ciency of the azimuth scanner (mirror 42 and the me for reciprocally rotating mirror 42) has only apprc mately 75% scan efficiency, due to the time needed change the direction of the mirror twice in each s( cycle. Thus, by synchronizing the two scanners so t the transition 66 is passing through the footprints 62 ɛ 64 while the mirror 42 is changing its direction of rc tion, an overall scan efficiency of approximately 7: can be attained.

In order for imaging lens 32 to focus bundles of paı lel light rays from the field of view onto the linear ɩ tector array 60, the optical path between lens 32 ɛ detector array 60 must be fixed. However, it is appari from FIG. 2 that the distance from lens 32 to reflect portion 48 of disc 34 to linear detector array 60 shorter than the distance from lens 32 to mirror 36 linear detector array 60. The optical path length diff ences can be equalized, despite the different physi distances, by providing a window, transparent to 1 light rays being scanned, at the transmissive portion of the disc 34. In FIG. 2, substrate 53 is such a windo The increased optical path length produced by wind( 53 depends upon the thickness of the window and index of refraction. These two parameters can then chosen, in a well-known manner, to produce the desir increase in the optical path length so that the lens will focus light rays reflected from mirror 36 onto 1 detector array 60.

FIG. 4 shows a tracing of the scan lines, superi posed on a field of view, produced by an optical scɛ ning device according to the invention used in conjuı tion with a known azimuth scanner. In this figure, a t field 70 is first scanned completely, with interlace, a then a bottom field 72 is completely scanned with int lace.

In this scanning scheme, the planar scanning mirı 42 rotates first in one direction to produce the odd-nu bered scan lines and then changes direction to produ the even-numbered scan lines. The small amount elevation motion provided by the rocking of scanni mirror 42 on a horizontal axis provides the interlace (t even-numbered scan lines between the odd-number scan lines).

During the scan of the top field 70, described abov the footprints 62 and 64 are wholly within one porti of the disc 34. As mirror 42 nears completion of the sc of top field 70 and returns to its starting position, t transition 66 between the reflective and transmissi portions of disc 34 passes through footprints 62 and ( Mirror 42 momentarily stops during this time aː changes direction to begin the scan of bottom field ʻ The scan of bottom field 72 then begins after transiti 66 has passed through footprints 62 and 64. Mirror now scans the odd-numbered lines in the bottom fieː and changes direction of rotation to scan the even-nuı bered lines of the bottom field. At the end of the scan the bottom field, transition 66 again passes throu, footprints 62 and 64 so that the transition 66 has pass through the footprints by the time mirror 42 is ready begin another scan of the top field.

Other scanning schemes, besides the scheme c scribed above, are also possible according to the invɛ

For example, it is possible to scan the odd-numbered lines of the top field without interlace, then step down to the bottom field and scan the even-numbered lines without interlace, then return to the top field and scan the even-numbered lines, and finally scan the odd-numbered lines of the bottom field. Other scanning methods are also possible.

Figure 5:
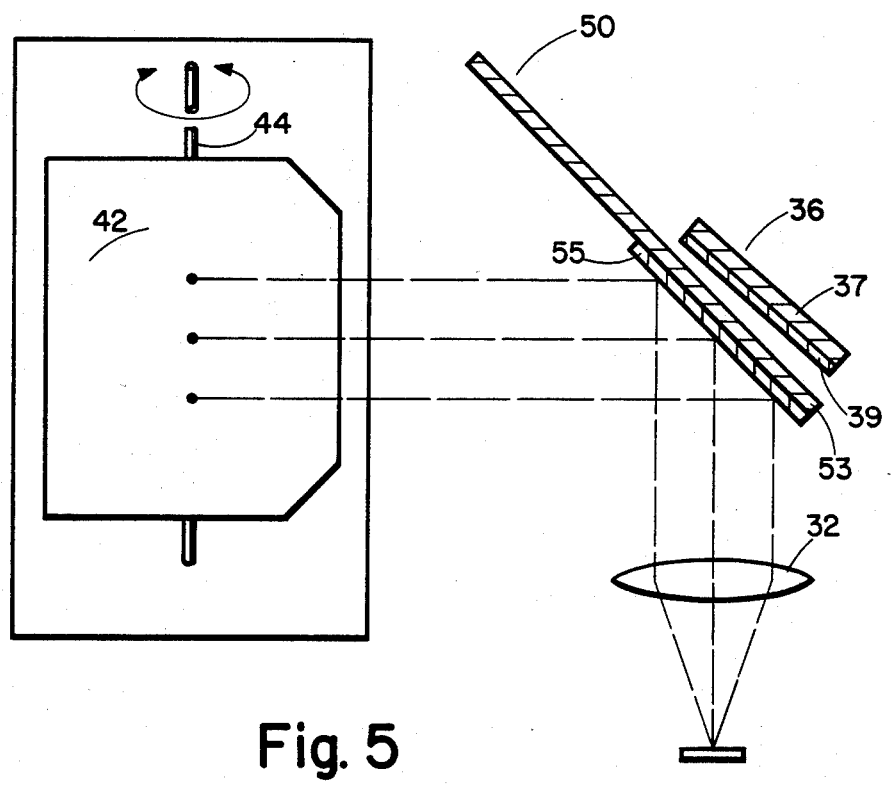
FIG. 5 is a partly cross-sectional and partly side elevational view of another optical scanning device according to the invention.

FIG. 5 shows an alternate embodiment of the invention in which lens 32 has been moved. Whereas in FIG. lens 32 is between mirror 42 and disc 34, in this embodiment lens 32 is located between disc 34 and detector array 60. By placing lens 32 in this position, it is no longer necessary to equalize the optical path lengths of rays reflected from disc 32 and rays reflected from mirror 36.

What is claimed is:

1. An optical image scanning device comprising:

means for focusing rays of light defining a field of view to produce an image of the field of view in an image plane;

means for detecting light rays, said detector means being arranged in the image plane;

means for scanning the image across the detector means in a scan direction;

a substantially planar disc having a front and a back and an axis perpendicular thereto, a first portion of the disc being reflective to the light rays from the field of view, a second portion of the disc being transmissive to the light rays from the field of view, said disc being arranged in the paths of the light rays from the field of view such that said light rays are incident on the front of the disc and are reflected by the reflective portion to produce an image at a first position in the image plane;

means for rotating the disc on its axis; and a substantially planar member, reflective to the light rays from the field of view, said reflective member being arranged behind the disc in a fixed position relative thereto such that light rays which pass through the transmissive portion of the disc are incident on the reflective member and are reflected to produce an image at a second position in the image plane, said second position being shifted relative to the first position in a shift direction which is transverse to the scan direction.

2. An optical image scanning device as claimed in claim 1, characterized in that the plane of the reflective member is defined by a normal thereto, the normal subtending a nonzero angle with respect to the disc axis.

3. An optical image scanning device as claimed in claim 2, characterized in that the focusing means comprises a lens arranged in the paths of the rays reflected by the disc and the reflective member.

4. A device as claimed in claim 2, characterized in that the disc is substantially circular and divided into two semicircular portions, one semicircular portion being reflective, the other semicircular portion being transmissive.

5. A device as claimed in claim 4, characterized in that the transmissive portion of the disc is substantially transparent to the light rays being scanned.

6. A device as claimed in claim 5, characterized in that the means for rotating the disc comprises an electric motor, said motor rotating the disc at a substantially constant angular velocity.

7. A device as claimed in claim 6, characterized in that the planar member is a fixed mirror.

8. A device as claimed in claim 7, characterized in that the normal to the fixed mirror and the disc axis are arranged in a single plane.

9. A device as claimed in claim 8, characterized in that the detector means comprises an array of point detectors arranged in a line in the plane of the normal to the fixed mirror and the disc axis.

10. A device as claimed in claim 9, characterized in that the focussing means comprises a lens arranged in the paths of the light rays which are incident on the disc.

11. A device as claimed in claim 10, characterized in that the light rays from the field of view are incident on a portion of the disc whose area is substantially less than one-half the area of the disc.

* * * * *